F. R. McDONALD.
FLUID CLUTCH.
APPLICATION FILED JAN. 10, 1918.
1,278,960.
Patented Sept. 17, 1918.
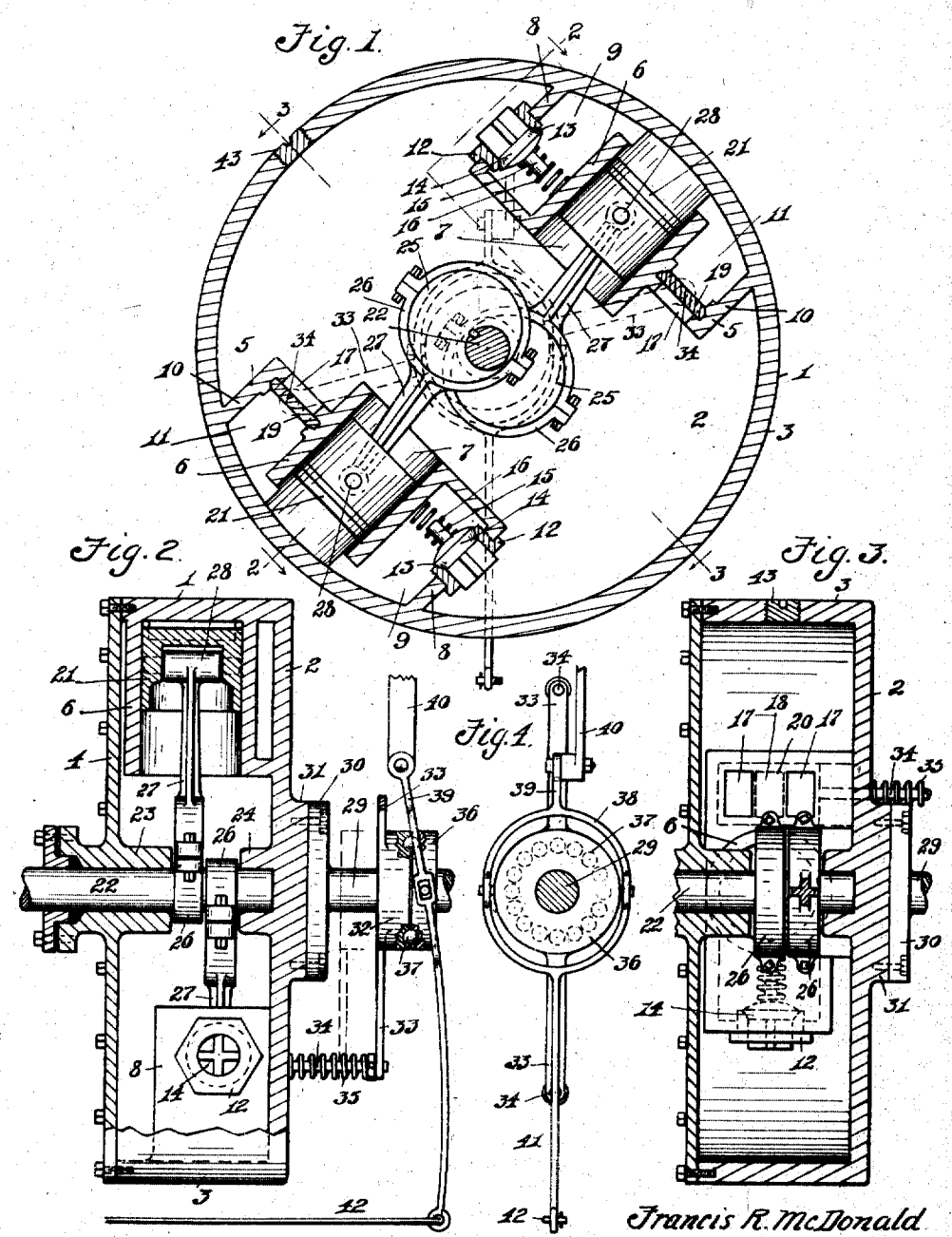
Francis R. McDonald
INVENTOR.
By George J. Оttsch
ATTORNEY.

UNITED STATES PATENT OFFICE.

FRANCIS R. McDONALD, OF SOUTH BEND, INDIANA.

FLUID-CLUTCH.

1,278,960.　　　　Specification of Letters Patent.　　Patented Sept. 17, 1918.

Application filed January 10, 1918. Serial No. 211,195.

*To all whom it may concern:*

Be it known that I, FRANCIS R. McDONALD, a citizen of the United States, residing at South Bend, in the county of St. Joseph and State of Indiana, have invented certain new and useful Improvements in Fluid-Clutches, of which the following is a specification.

This invention relates to clutches of the fluid-controlled type, wherein the connection between the clutch members is provided in the form of opposed radially-acting balanced pistons moving a body of fluid, and means to control the rate of flow of such fluid to retard or check the piston movement and thereby connect the clutch members.

Fluid clutches governed by the control of the flow of the fluid have been heretofore proposed, but the construction of such, at least as a general type, is difficult of commercial construction, is not balanced in action, and depends upon the end area of the piston for the resistance.

The present invention has for its object to provide a clutch of this type in which the piston action is balanced on the driven shaft, and the arrangement of the cylinders and valve chambers within the clutch member simplified for the commercial betterment of the structure.

In the drawings:—

Figure 1 is a vertical section, partly in elevation, illustrating the construction.

Fig. 2 is a section on line 2—2 of Fig. 1.

Fig. 3 is a section on line 3—3 of Fig. 1.

Fig. 4 is an end elevation illustrating the valve control means.

The improved clutch is here shown as comprising a cylindrical casing 1, having an end wall 2 and an annular side wall 3, that end of the casing opposite the wall 2 being preferably closed by a removable wall 4, bolted or otherwise secured in place to form a fluid-tight juncture.

At diametrically opposite points within the casing, and to the annular and fixed end wall thereof, is arranged, by casting or otherwise, hollow block-like extensions 5. These block-like extensions are interiorly formed to provide a cylinder and opposing valve chambers. For example, as shown, each extension has an approximately central cylindrical wall 6 forming a cylinder 7, the space between one section of the wall 6 and an adjacent end wall 8 providing an inlet valve chamber 9, and a space between the opposing sections of the wall 6, and the opposite end wall 10 of the extension forming an exhaust valve chamber 11. The respective valve chambers extend throughout the full width of the casing, including the space within the extension beyond the cylinder 7.

The cylinders 7 are arranged in exact diametric opposition in the casing, and as a particular feature of the present invention, it will be noted, that the outer ends of the cylinders 7, or those ends within the extension terminate inwardly of the annular wall of the casing, so that the interior of the cylinder is, in the absence of the piston to be referred to, fully and freely open to both the inlet and exhaust valve chambers.

One wall of the inlet valve chamber is formed with an opening to receive an annular section 12 formed within the valve chamber to provide a valve seat 13. A valve 14 is arranged to coöperate with this seat, operating to open under pressure from without, and close against pressure from within the chamber. The valve has a cruciform extension fitting the section 12 to guide the valve in movement, and a pin 15 projecting from its inner surface to receive one end of a coil spring 16, bearing at its opposite end against the cylinder wall, to thereby normally hold the valve closed. The pin is of such length as to limit the inward movement of the valve to prevent possibility of the entire separation of the element from its seat member.

The exhaust valve chamber is formed in what may be termed its bottom wall with spaced apertures 17, separated by an intervening solid wall portion 18 approximately coextensive with the apertures. A slide valve 19 is mounted in grooves in the walls of the exhaust valve chamber inwardly of the bottom wall, and is formed with an aperture 20 corresponding in size to one of the apertures 17 of the bottom wall. The valve is of a length equal to the similar dimension of one of the apertures 17 and the solid portion 18, so that in one full position of the valve both apertures 17 are open, while in the other position both apertures are closed. Of course the valve is adapted for any intermediate position desired.

A piston 21 is operative in each cylinder 7, and these pistons are connected for crank action upon the driven shaft 22. This shaft, which is extended beyond the clutch for any desired purpose, is rotatably mounted in a bearing 23 formed by a central enlargement of the removable end plate or wall 4 of the casing; the extreme end of the shaft being mounted in a blind bearing 24 extending inwardly from the fixed end wall 2 of the casing. Secured upon the driven shaft in radial line with the respective pistons are disks 25. These disks 25 are mounted eccentrically on the driven shaft, are in direct diametric opposition in their eccentric relation to the shaft, and these disks are connected to the respective pistons through the medium of eccentric straps 26 encircling and radially bearing on the peripheral edges of the disks and connecting rods 27 extending from the straps and having wrist pin connections 28 with the hollow pistons.

As preferred and as here shown, the hollow extensions in which the valve chambers and cylinders are formed are slightly offset from the true transverse alinement with respect to the end wall 2 of the casing, permitting a direct drive between the particular piston and its crank disk.

The driving shaft 29 is connected directly to the fixed end wall of the casing, preferably by having the end enlargement 30 of such shaft bolted or otherwise secured to a centrally-arranged thickened portion 31 of the casing wall.

The exhaust valves are of course to be operated to control the flow of fluid, and a preferred type of such operating means is here shown as a collar 32 slidably mounted on the driving shaft immediately beyond the casing and having radial arms 33 to engage stems 34 projecting from the respective exhaust valves. The stems 34 extend through the fixed wall 2 of the casing, in a manner to prevent leakage, and are provided with coil springs 35 bearing between the wall and collars on the stems to normally hold the exhaust valve open. A shifting collar 36 is loosely mounted on the driving shaft 29 and adapted to engage the collar 32. Anti-friction balls 37 are arranged in a raceway formed in the adjacent faces of the collars to minimize friction, as the collar 32 revolves with the casing while the collar 36 does not revolve. A yoke 38 is loosely connected to the shifting collar and has an upstanding arm 39 pivotally mounted on a fixture 40. A depending arm 41 is provided for the yoke and connected at its lower end to an operating member 42, through use of which, as will be apparent, the exhaust valves may be simultaneously shifted as may be desired.

The casing 1 is designed to be completely filled with a fluid, such for example as oil, a plug-closed filling opening 43 being provided in one wall of the casing for the purpose. The fluid completely fills the interior of the casing, cylinders, except for piston displacement, and valve chambers. With the driving shaft in operation and the exhaust valves fully open the movement of the casing induces a reciprocating play of the piston, but as the flow of the oil incident to such play is entirely free, the exhaust valve openings fully compensating for the piston displacement, there is no resistance to the play of the pistons, and hence no movement is imparted to the driven shaft. In this play of the pistons the fluid is drawn in through both the inlet and exhaust valves, the cylinders being fully open to both chambers. With the exhaust valves closed, fully or to any desired degree, the outward flow of the fluid from the cylinders is retarded or checked, and hence the free play of the piston is prevented, and the resistance thus created causes a retardation of the movement of the pistons, in direct proportion to the degree of checking of the fluid flow. This retardation causes the pistons to exert a corresponding pressure on the crank disks of the driven shaft, so that said shaft is thereby compelled to revolve.

Under a gradual closing of the check valve therefore, a gradual movement is imparted to the driven shaft, until when the exhaust valves are fully closed the driven shaft is moving as a unit with the clutch casing.

In the arrangement described a practically balanced structure is provided, the disks acting as opposed cranks. The resisting force of the fluid is augmented by the fact that in the suction stroke of the pistons fluid is drawn into the cylinders through both the inlet and exhaust valves, and a materially simplified valve structure is provided for as a result of this arrangement. Furthermore the entire structure of the chambers, valves and cylinders is located with a particular view to convenience in manufacture.

Having thus described the invention, what is claimed as new, is:—

1. A fluid clutch for connecting a driving shaft to a driven shaft, comprising a fluid-filled casing connected to the driving shaft, hollow extensions within the casing and formed to provide a cylinder, an inlet valve chamber and an exhaust valve chamber, inlet valves controlling the communication between the casing and inlet valve chamber, exhaust valves controlling the communication between the exhaust valve chamber and the casing, a piston in each cylinder, and opposed eccentric disks secured upon the driven shaft and connected to the pistons.

2. A fluid clutch for connecting a driving shaft and driven shaft, comprising a fluid-filled casing, opposed hollow extensions arranged therein and formed to provide valve chambers and a cylinder, that end of the cylinder within the extension being in open communication with both chambers, pistons within the cylinders, opposed eccentric disks on the driven shaft, and connections between said disks and the pistons.

3. A fluid clutch comprising a driving casing, opposed extensions each formed to provide independent inlet and exhaust chambers and an intermediate cylinder open to both chambers, an inlet valve for one valve chamber, an exhaust slide valve for the other valve chamber, means for simultaneously and similarly operating the exhaust valves, pistons in the cylinders, and crank connections between said pistons and a driven member.

4. A fluid clutch comprising a driving casing, two diametrically opposed extensions each formed to provide independent inlet and exhaust chambers and an intermediate cylinder open to both chambers, means for manually controlling the exhaust flow from the exhaust chamber, disks secured in opposed eccentricity upon a member to be driven, and a piston in each cylinder connected to one of said disks.

5. A fluid clutch for connecting a driving shaft to a driven shaft, comprising a fluid-filled casing connected to the driving shaft, diametrically opposed units arranged in and secured to the casing and each including independent valve chambers and a cylinder freely open to both chambers, means for controlling the fluid flow from one of said valve chambers of each unit, bearings formed in the opposing end walls of the casing to rotatably receive the driven shaft, disks secured on said shaft within the casing and between the bearings and mounted in direct opposition to each other and in eccentric relation to the driven shaft, a piston operating in each cylinder, eccentric straps encircling the disks, and connections between the respective straps and pistons.

In testimony whereof I affix my signature.

FRANCIS R. McDONALD.